(12) United States Patent
Bouman

(10) Patent No.: US 9,209,638 B2
(45) Date of Patent: Dec. 8, 2015

(54) CHARGER FOR A BATTERY, PLURALITY OF COUPLED CHARGERS AND METHOD OF OPERATING

(75) Inventor: Crijn Bouman, XD Den Haag (NL)

(73) Assignee: ABB B.V., Rotterdam (NL)

( * ) Notice: Subject to any disclaimer, the term of this patent is extended or adjusted under 35 U.S.C. 154(b) by 430 days.

(21) Appl. No.: 13/808,742

(22) PCT Filed: Jul. 4, 2011

(86) PCT No.: PCT/NL2011/050477
§ 371 (c)(1),
(2), (4) Date: Mar. 21, 2013

(87) PCT Pub. No.: WO2012/005573
PCT Pub. Date: Jan. 12, 2012

(65) Prior Publication Data
US 2013/0187602 A1     Jul. 25, 2013

(30) Foreign Application Priority Data

Jul. 5, 2010  (NL) ..................................... 2005026

(51) Int. Cl.
*H02J 7/00*     (2006.01)
*H02J 7/14*     (2006.01)
*B60L 11/18*    (2006.01)

(52) U.S. Cl.
CPC ........... *H02J 7/0068* (2013.01); *B60L 11/1811* (2013.01); *H02J 7/0027* (2013.01);
(Continued)

(58) Field of Classification Search
USPC ......... 320/108, 109, 116, 106, 119, 124, 125, 320/137, 138, 148, 149, 150
See application file for complete search history.

(56) References Cited

U.S. PATENT DOCUMENTS

| 5,461,298 A | * | 10/1995 | Lara ...................... B60L 3/0046 |
| | | | 320/109 |
| 5,596,258 A | * | 1/1997 | Kimura ................. B60L 3/0084 |
| | | | 320/109 |

(Continued)

FOREIGN PATENT DOCUMENTS

| WO | WO 01/97360 A2 | 12/2001 |
| WO | WO 2010/038152 A1 | 4/2010 |

OTHER PUBLICATIONS

International Search Report (PCT/ISA/210) issued on Jul. 10, 2012, by the European Patent Office as the International Searching Authority for International Application No. PCT/NL2011/050477.

(Continued)

*Primary Examiner* — Edward Tso
*Assistant Examiner* — Alexis A Boateng
(74) *Attorney, Agent, or Firm* — Buchanan Ingersoll & Rooney PC

(57) ABSTRACT

A network of chargers for a battery of an electric vehicle is disclosed, having a 1st power connection, a power converter, a 2nd power connection and at least a 3rd power connection for exchanging power with another charger. A controller is provided for controlling a power switch, and is configured to: connect the power converter to the 2nd power connection when a vehicle is to be charged from the power source, connect the power converter to the at least one 3rd power connection when power is to be delivered to another charger, and connect the at least one 3rd power connection to the 2nd power connection when power from another charger is to be delivered to the vehicle.

14 Claims, 4 Drawing Sheets

(52) U.S. Cl.
CPC .......... *Y02T10/7005* (2013.01); *Y02T 10/7055* (2013.01); *Y02T 10/92* (2013.01); *Y02T 90/127* (2013.01); *Y02T 90/14* (2013.01)

(56) References Cited

U.S. PATENT DOCUMENTS

| | | | | |
|---|---|---|---|---|
| 5,952,813 | A * | 9/1999 | Ochiai | H02J 7/0011 320/104 |
| 8,525,476 | B2 * | 9/2013 | Ichikawa | B60L 3/0069 191/12.2 A |
| 2002/0070705 | A1 | 6/2002 | Buchanan et al. | |
| 2004/0189251 | A1 | 9/2004 | Kutkut et al. | |
| 2006/0108971 | A1 * | 5/2006 | Ono | H02J 7/1461 320/104 |
| 2009/0177595 | A1 * | 7/2009 | Dunlap | B60L 11/1824 705/412 |
| 2010/0013434 | A1 * | 1/2010 | Taylor-Haw | B60L 11/1818 320/109 |
| 2010/0301802 | A1 * | 12/2010 | Iida | B60L 11/1816 320/109 |
| 2011/0187197 | A1 | 8/2011 | Moth | |
| 2012/0007554 | A1 * | 1/2012 | Kanamori | B60L 11/1824 320/109 |
| 2012/0091958 | A1 * | 4/2012 | Ichikawa | B60L 3/0046 320/109 |

OTHER PUBLICATIONS

Written Opinion (PCT/ISA/237) issued on Jul. 10, 2012, by the European Patent Office as the International Searching Authority for International Application No. PCT/NL2011/050477.
International Preliminary Report on Patentability (PCT/IPEA/409) issued on Oct. 16, 2012, by the European Patent Office as the International Examining Authority for International Application No. PCT/NL2011/050477.

* cited by examiner

CHARGER FOR A BATTERY, PLURALITY OF COUPLED CHARGERS AND METHOD OF OPERATING

The present invention relates to a charger for a battery of an electric vehicle, a plurality of coupled chargers of said type, and a method of operating these chargers.

When establishing a charging station for enabling a plurality of electric vehicles, a decision needs to be made about the charging power the available battery chargers need to be available. When the charging requirements grow, the need for more powerful chargers grows along. Herein, it may be a goal to be able to provide optimal charging service for each vehicle at every port of a charging station. As a result, each charger may be dimensioned such that it can handle the largest charging power that can be foreseen under operating conditions. In practice however, this means that the chargers are over dimensioned for the requirements of the majority of vehicles to be charged.

An example hereof is the US patent application US 2004 189 251, describing a modular charger—not in particular for electric vehicles—that can be provided with additional power converters to increase its power.

A different solution is proposed by the international patent application WO 01 97360, describing a configuration of a number of chargers, wherein the power outputs of two chargers can either deliver power to a different vehicle, or both to the same vehicle.

It is a goal of the present invention to provide a charger for a battery of an electric vehicle, while overcoming the above disadvantages of the prior art.

Thereto, according to the present invention, a network of chargers for a battery of an electric vehicle is proposed, each charger comprising a 1st power connection, for exchanging power with a power source, a power converter, such for converting the power from the power source to a charge current suitable value for charging electric vehicles, at least a 2nd power connection, for exchanging power with the vehicle, and at least a 3rd power connection, for exchanging power with another charger, the charger being configured for routing power to the 2nd power connection, when a vehicle is to be charged from the power source, and/or to the at least one 3rd power connection, when power is to be delivered to another charger and/or to route power from the at least one 3rd power connection to the 2nd power connection when power from another charger coupled to the 3rd power connection is to be delivered to the vehicle.

It needs to be emphasized here that power may effectively positive or negative, so a vehicle may also be discharged to deliver power through the converter to a power source. A power connection may be equipped with multiple connectors and adaptors, to facilitate for example coupling of vehicles with different physical power connections.

The above charger is able to exchange energy with a power source, a vehicle to be charged, and another power converter. During regular use, the exchange with the power source may essentially be in a direction from the source to the charger, and from the charger to a vehicle battery or to another charger (and therewith indirectly to a vehicle battery too). Therewith, additional power may be obtained from another charger and delivered to the battery, or power may be delivered to another charger. For that purpose, power may be routed in such way that multiple power flows are present at a time. Then charging a battery, delivering power essentially means controlling the current towards the battery, since the voltage is determined by the battery.

To summarize, the current invention makes it possible to connect chargers together to form a more powerful charging system with multiple charging connections.

In a practical realization, the charger may comprise a controllable power switch, coupled to at least two from the group of the power converter, the 2nd power connection and the at least 3rd connection, and a controller for routing power by controlling the switch, configured to perform at least one of connect the power converter to the 2nd power connection, when a vehicle is to be charged from the power source; connect the power converter to the at least one 3rd power connection, when power is to be delivered to another charger; and/or connect the at least one 3rd power connection to the 2nd power connection when power from another charger is to be delivered to the vehicle. The power switch can be an electrical switching device that can be controlled in any way, for example a manually operated electrical switch, relay, semiconductor device, transistor, mosfet, solid state relay, reed switch, thyristor or (opto-)triac.

Due to the possibility to obtain part of the converted power from a neighbouring power converter belonging to a coupled charger, the power converter does not need to be overdimensioned, but it can be dimensioned for use with a regular vehicle. As an example it can be 10 kW. When the charger is coupled to another 10 kW power converter on board, a total power of 20 kW could be delivered via the 2nd power connection, to a vehicle. Another extreme situation could be to deliver the full amount of 10 kW to the neighbouring charger. Evidently, higher multiples can be obtained when more than three connections are available and multiple chargers are mutually coupled.

In an embodiment at least one of the 2nd and at least one 3rd power connection and or cabling coupled therewith is dimensioned for conducting at least a multiple of the power convertible by the power converter. This enables the use of a plurality of similar or the same chargers, that can be fully used for charging one vehicle when required.

In an embodiment the 1st power connection of each charger may obtain its power from a power source such as a utility grid connection, a renewable power source, a generator or an energy storage device such as a battery, capacitor or flywheel. In a further embodiment with multiple chargers connected to each other, each charger could have a different power source connected to its 1st power connection.

In some embodiments the power converter may be a bidirectional converter enabling energy to flow from the vehicle to one of the power source connections. This configuration could allow functionality commonly referred to as "vehicle-to-grid" but it could also be used to charge a stationary battery from one of the vehicle batteries.

The controller of the charger may further be configured to control switching based on information obtained from at least one from the group of a vehicle with a battery to be charged, another charger coupled to the charger, a grid of other power source or a remote control device. For that purpose, communication means may be provided, for example the 2nd power connection may comprise communication lines for communicating with an on board vehicle-, battery- or engine control system, that may provide (maximum) charging currents, a maximum available charging time, or the like.

The chargers may be provided with communication network connectors, to communicate with each other. A charger to which a vehicle is coupled may determine, for example based on communication with the vehicle, how much power is desired to charge the vehicle in a predetermined time, and then request one or more neighbouring chargers for additional power when the power demand exceeds its convertor's power. Furthermore the grid may provide information on or restrictions to the available power. A further possibility is that the charger is equipped with means for remote communication, such as wireless or internet communication, to be controlled or provided with data regarding power requirements from a central control centre.

If for instance one of the chargers that are connected to each other, does not have one of the mentioned communication means, the communication means may be shared between chargers. For example when four chargers are connected to each other, and only one charger has an internet connection, the connection can be shared with the other chargers through a communication associated with the at least one 3rd power ports.

In an embodiment, the controller is configured to connect the 1st power connection to the 2nd power connection, to enable charging batteries of vehicles with on-board chargers directly from the power source. Besides enabling to charge vehicles with on-board chargers, this gives the opportunity to use the power converter of the charger to deliver power to another charger, coupled to the 3rd or more power connection.

In order to regulate the power rate and waveform of the power delivered to the vehicle or another charger, the power converter may further be coupled to a controller, for controlling the required output power and form. Herein, the controller for controlling the switch and the controller controlling the power converter are integrated, and for example be embodied by a common microprocessor.

With chargers according to the invention, multiple advantageous embodiments can be made. Thereto, a plurality of chargers can each be coupled to a power source and together form a modular charging node system by being mutually interconnected by via their at least one 3rd power connections. Depending on the fact if there are three or more power connections, different interconnections can be made. A few examples will be elaborated into more detail in the following.

When the chargers are provided with only a 3rd power connection for connection to another charger, these 3rd power connections of all chargers can have a common connection, thus forming a power bus, or a star-connection. The number of chargers for which this configuration can be applied is two or more. When two chargers are used, a direct communication line between these chargers may be provided, and when a growing number of chargers is used, an Ethernet or like IP communication can be provided.

When each charger has at least two 3rd power connections, the modular charging node system may be coupled ring-wise, that is, each charger is coupled to two adjacent chargers. This embodiment has the advantage that the thus resulting configuration is less sensitive for disruptions when one of the connections gets broken, since the charger may in that case receive or deliver power from the remaining other connection.

In a further embodiment, each charger has a plurality of 3rd power connections, and the modular charging node system is formed by mutually connecting the 3rd power connections of multiple chargers. The resulting configuration is a web, wherein all or essentially all chargers are connected directly to each other, resulting in a very high reliability.

In a further embodiment the charging system is equipped with a solution for the losses (such as voltage drop) occurring in the charging cables or in the cables connecting the 3rd power ports of each subsequent charger. Examples of such solutions are large diameter cables or, more sophisticated, a system with a controller which could control the power converters to compensate for the voltage drop in each cables. Such systems can be especially beneficial in the case that the distance between each individual charger is large or when many chargers are connected together.

In another embodiment the charger is equipped with at least one system to measure the amount of electric energy transferred through for instance the $1^{st}$ power connection, the 2nd power connection or the 3rd power connection. As such a system consisting of multiple chargers could be equipped with a multitude of energy measurement devices or methods.

As an example of a physical embodiment the 1st power connection and power converter can physically be located in one isolated compartment of the system whereas the 2nd power connection and 3rd power connection can be located in another isolated compartment. The invention is not limited to a specific physical arrangement as there are many possibilities for arranging the system. The invention will now be explained into more detail with reference to the following figures. Herein:

Figure 1A:
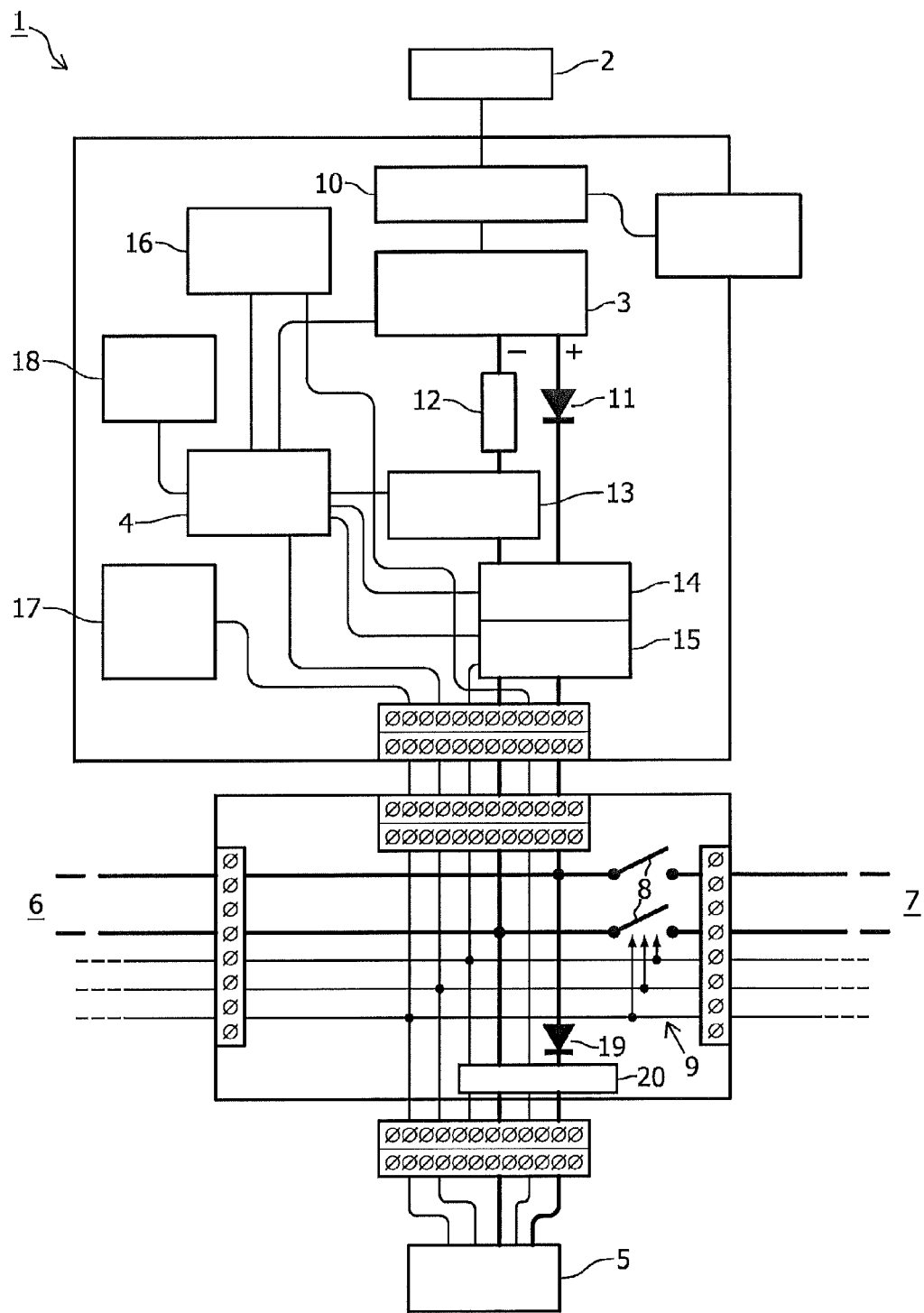
FIGS. 1a-1e show a schematic overviews of embodiments of chargers.

FIG. 1a shows a schematic overview of an embodiment 1 of a charger according to the present invention. The charger comprises a 1st power connection 2, for exchanging power with a power source, such as a mains, but any other source may be used here, including solar or wind energy sources. Furthermore a power converter, formed by a controllable AC/DC converter 3 by a microcontroller 4. A 2nd power connection 5 is available, for exchanging power with the vehicle (not shown). A 3rd and a fourth power connection 6, 7 for exchanging power with another charger are also shown, forming part of a so called power hub that is incorporated in the charger, and which comprises a controllable power switch 8. The controller 4 is also used for controlling 9 the switch 8, in particular to connect the power converter to the 2nd power connection, when a vehicle is to be charged from the power source, to connect the power converter to the at least one 3rd power connection, when power is to be delivered to another charger, and to connect the at least one 3rd power connection to the 2nd power connection when power from another charger is to be delivered to the vehicle.

As shown in FIG. 1a, the switch 8 may be a multi-polar switch. The current line is connected to additional components (in this case a circuit breaker 10 with an emergency button, a fuse 12, a diode 11, a current sensor 13, a voltage sensor 14 and an isolation monitor 15) that are needed for correct operation, safety and/or compliance to a charging standard. Furthermore a network connection 16 is present, as well as a possibility to couple an auxiliary power supply to the charger, for directly charging a vehicle there from. A user interface 18 is present to provide a person who is charging a vehicle with information. Finally, a 2nd diode 19 is present to protect the charger against over currents from a vehicle, and a measurement unit 20 to take measurements at the vehicle connection.

Figure 1B:
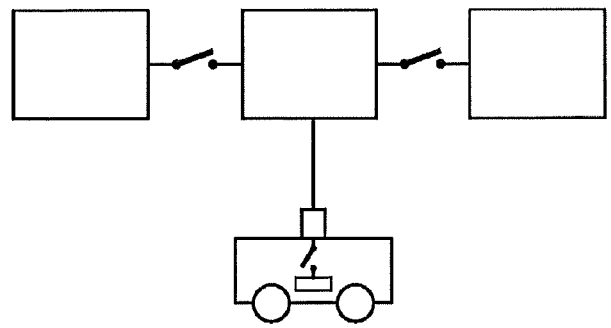

FIG. 1b shows an embodiment wherein the second power connection 5 is coupled directly to the vehicle and only the third power connection 6 is coupled via a switch to a fourth power connection 7 of a neighbouring charger. The vehicle comprises its own switch which is managed by a vehicle management system.

Figure 1C:
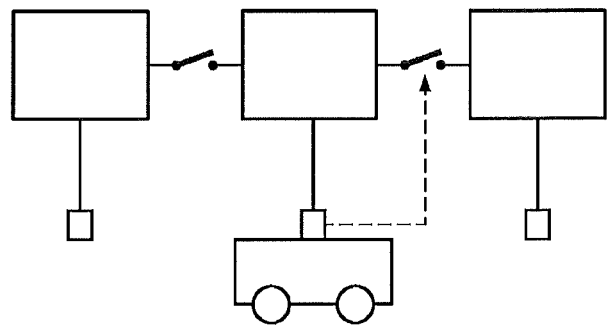

FIG. 1c shows an embodiment wherein the chargers are coupled. The connections between the chargers is controlled by the presence of a vehicle at the charging connection. The switch is opened by the presence of the vehicle. The vehicle will only be connected to the charger it is connected to and the chargers that are to the left of it. For example the presence of a vehicle can be detected by a switch, or the presence or absence of voltage, current or resistance on the connector. For instance the vehicle can supply power to the switch to open it.

Figure 1D:
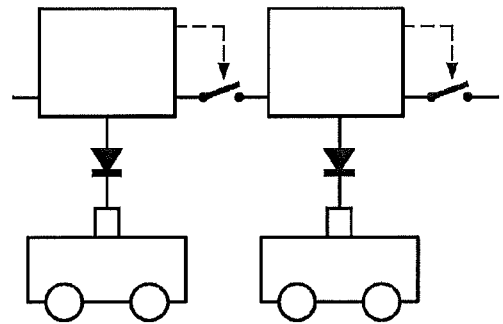

FIG. 1d shows yet another embodiment, using a diode in the charging connection, so that the switch does not immediately need to be opened upon the presence of a vehicle. When two vehicles are connected to the charging system, with different voltages, the diode will prevent discharge of the higher voltage battery. Instead all the power of the charging system will flow into the battery with the lowest voltage. The optional switch will provide the opportunity to charge the higher voltage battery by separating the two chargers.

Figure 1E:
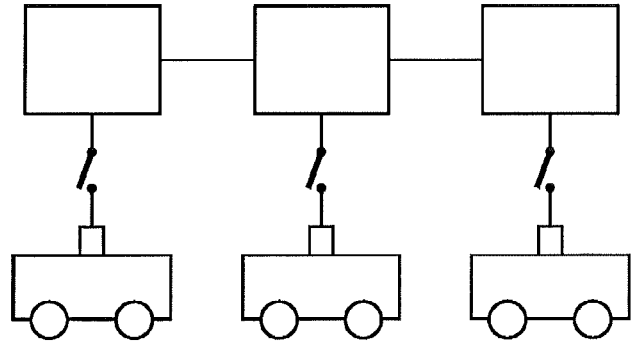

FIG. 1e shows an embodiment of the invention where the chargers are directly connected to each other. The charging strategy can be a sequential system, where each of the vehicles receive the combined power of the chargers in turn. Another charging strategy may be that the battery with the lowest voltage is charged to the level of the battery with second lowest voltage. Then the two lowest voltage batteries are charged in parallel, until they reach the voltage of the next battery voltage, which in its turn is connected.

Figure 2:
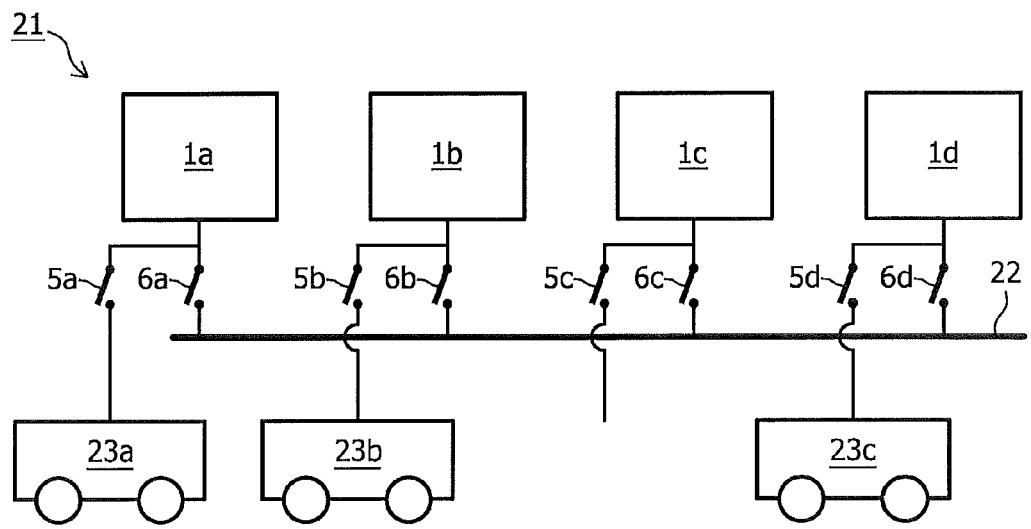
FIG. 2 shows a 1st configuration of interconnected chargers.

FIG. 2 shows a 1st configuration of interconnected chargers 1a-1d, such as charger 1 from FIG. 1, but with only a 3rd power connection 6a-6d. The 3rd power connections 6a-6d are interconnected, and form a power bus 22. Three of the four 2nd power connections 5a-5d are coupled with vehicles 23a-23c. The power converter of charger 1c may be used to provide converted power to one or more of the vehicles 23a-c for charging their on-board battery.

Figure 3:
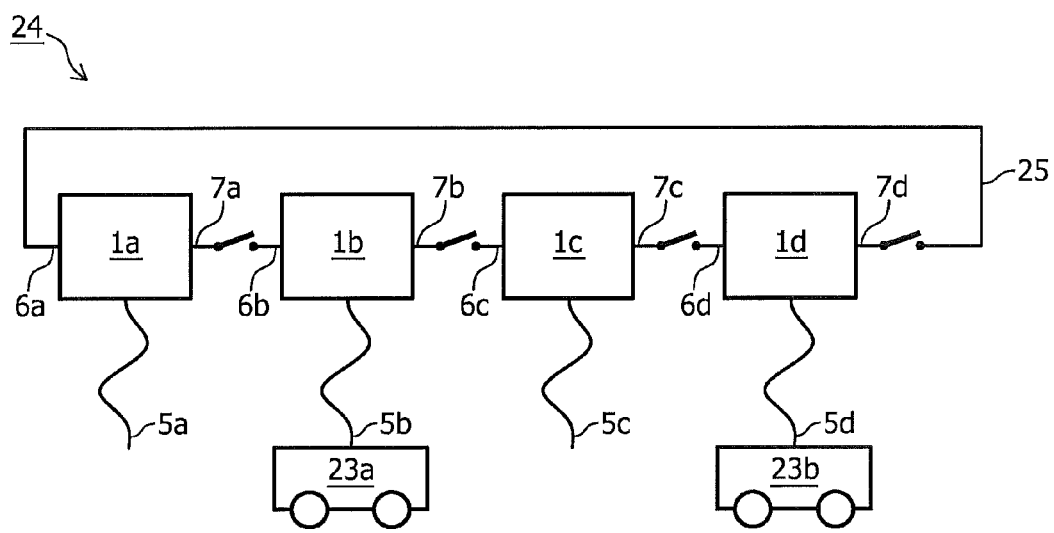
FIG. 3 shows a 2nd configuration of interconnected chargers.

FIG. 3 shows an embodiment 24 wherein the chargers 1a-1d are each provided with 3rd and fourth power connections 6a-6d, 7a-7d for other chargers. The 3rd power connections 6a-6d are coupled to the fourth power connections 7a-7b of adjacent chargers respectively. Two vehicles 23a and 23b are coupled to the 2nd power couplings 5b, 5d.

Figure 4:
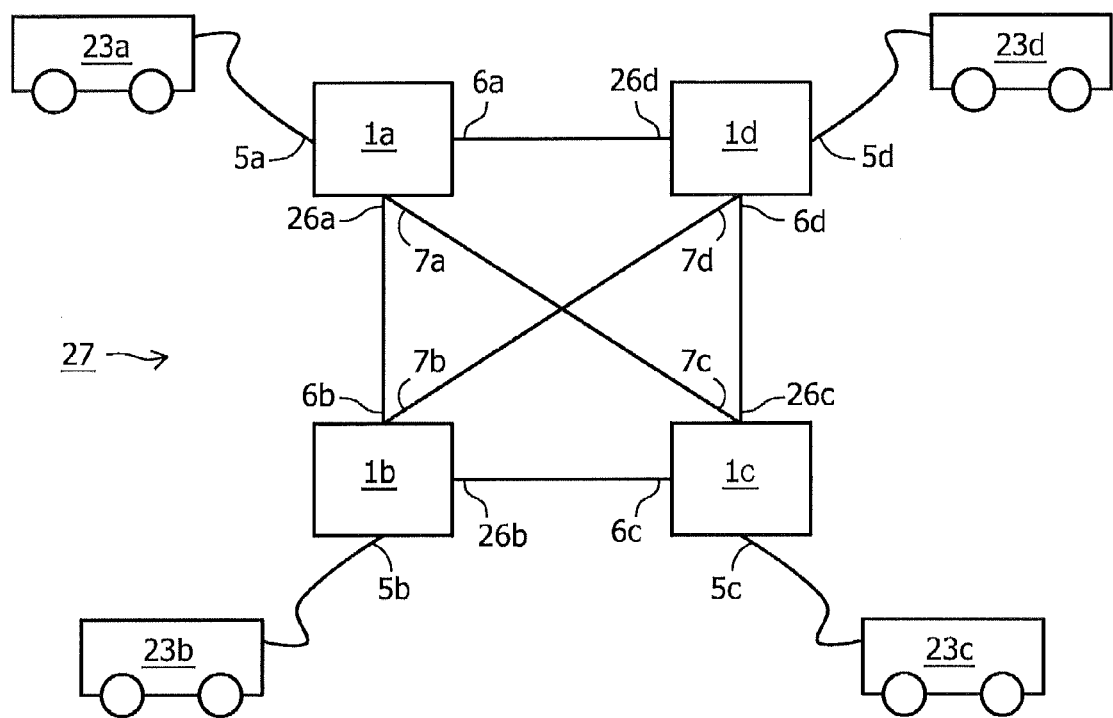
FIG. 4 shows a 3rd configuration of interconnected chargers.

FIG. 4 shows yet another embodiment 27 wherein the chargers 1a-1d are provided with three power connections 6a-6d, 7a-7d, 26a-26d to all respective other chargers. To the respective 2nd power connections of the chargers vehicles 23a-23d are coupled to charge their batteries.

The invention claimed is:

1. Network of chargers for electric vehicles, each charger comprising:
   a 1st power connection, for exchanging power with a power source;
   a power converter for converting power from the power source to a charge current suitable value for charging electric vehicles;
   at least one 2nd power connection for exchanging power with a vehicle; and
   at least one 3rd power connection for exchanging power with another charger;
   the charger being configured for routing power to the at least one 2nd power connection when a vehicle is to be charged from the power source, and/or to the at least one 3rd power connection when power is to be delivered to another charger and/or to route power from the at least one 3rd power connection to the 2nd power connection when power from another charger coupled to the 3rd power connection is to be delivered to the vehicle,
   wherein:
   the chargers, when coupled to a power source, being a grid connection, together form a charging node system by being mutually interconnected via their at least one 3rd power connections, and wherein:
   at least one of the chargers comprises a controllable power switch coupled to at least two of: the power converter, the at least one 2nd power connection and the at least one 3rd connection; and
   a controller is provided for routing power by controlling the switch, and is configured during operation to perform at least one of:
   connect the power converter to the at least one 2nd power connection when a vehicle is to be charged from the power source;
   connect the power converter to the at least one 3rd power connection when power is to be delivered to another charger; and
   connect the at least one 3rd power connection to the at least one 2nd power connection when power from another charger is to be delivered to the vehicle, wherein the controller is configured during operation to route power based on information obtained from a vehicle with a battery to be charged.

2. Network of chargers according to claim 1, wherein the at least one 3rd power connection of each charger has a common connection, thus forming a power bus.

3. Network of chargers according to claim 1, wherein the power converter is coupled directly to at least one of the power connections or the power switch.

4. Network of chargers according to claim 1, wherein the controller, during operation, will be configured to route power from the 1st power connection to the at least one 2nd power connection, to enable charging batteries of vehicles with on-board chargers directly from the power source.

5. Network of chargers according to claim 1, wherein the power converter is further coupled to the controller for controlling output power and form.

6. Network of chargers according to claim 5, wherein the controller for controlling the switch and for controlling the power converter is an integrated controller.

7. Network of chargers according to claim 1, comprising: means for remote communication, to be controlled or provided with data regarding power requirements from a central control centre.

8. Network of chargers according to claim 1, wherein each charger is coupled to a power source and together the network of chargers form a modular charging node system by being mutually interconnected via their at least one 3rd power connections.

9. Network of chargers according to claim 1, wherein the at least one 3rd power connections of the chargers have a common connection, thus forming a power bus.

10. Network of chargers for electric vehicles, each charger comprising:
   a 1st power connection for exchanging power with a power source;
   a power converter for converting power from the power source to a charge current suitable value for charging electric vehicles;
   at least one 2nd power connection for exchanging power with a vehicle; and
   at least one 3rd power connection for exchanging power with another charger;
   wherein:
   the chargers, when coupled to a power source, being a grid connection, together form a modular charging node system by being mutually interconnected by via their at least one 3rd power connections, wherein:

each charger has at least two 3rd power connections, and the modular charging node system is coupled ring-wise, and wherein each charger comprises:
a controllable power switch, coupled to at least two of: the power converter, the at least one 2nd power connection and the at least one 3rd connection; and
a controller for routing power by controlling the switch, the controller being configured during operation to perform at least one of:
connect the power converter to the at least one 2nd power connection when a vehicle is to be charged from the power source;
connect the power converter to the at least one 3rd power connection when power is to be delivered to another charger; and
connect the at least one 3rd power connection to the 2nd power connection when power from another charger is to be delivered to the vehicle, wherein the controller is configured during operation to route power based on information obtained from a vehicle with a battery to be charged.

11. Network of chargers according to claim 10, wherein each charger comprises:
a plurality of 3rd power connections, and the modular charging node system is formed by mutually connecting the at least one 3rd power connections of multiple chargers.

12. Network of chargers according to claim 10, wherein the power converter is coupled directly to at least one of the power connections or the power switch.

13. Method for operating a plurality chargers for batteries of electric vehicles, the chargers being interconnected as a network of chargers for electric vehicles, each charger comprising:
a 1st power connection for exchanging power with a power source;
a power converter for converting power from the power source to a charge current suitable value for charging electric vehicles;
at least one 2nd power connection for exchanging power with a vehicle; and
at least one 3rd power connection for exchanging power with another charger;
the charger being configured for routing power to the at least one 2nd power connection when a vehicle is to be charged from the power source, and/or to the at least one 3rd power connection when power is to be delivered to another charger and/or to route power from the at least one 3rd power connection to the 2nd power connection when power from another charger coupled to the 3rd power connection is to be delivered to the vehicle, wherein:
the chargers, when coupled to a power source, being a grid connection, together form a charging node system by being mutually interconnected via their at least one 3rd power connections, and wherein:
at least one of the chargers comprises a controllable power switch coupled to at least two of: the power converter, the at least one 2nd power connection and the at least one 3rd connection; and
a controller is provided for routing power by controlling the switch, and is programmed to perform, the method comprising:
connecting the power converter to the 2nd power connection when a vehicle is to be charged from the power source;
connecting the power converter to the at least one 3rd power connection when power is to be delivered to another charger; and
connecting the at least one 3rd power connection to the 2nd power connection when power from another charger is to be delivered to the vehicle.

14. Method according to claim 13, comprising:
conducting at least a multiple of the power convertible by one power converter through a 2nd power connection to a vehicle to be charged.

* * * * *